US009258610B2

(12) United States Patent
Kulick et al.

(10) Patent No.: US 9,258,610 B2
(45) Date of Patent: *Feb. 9, 2016

(54) CORRELATION OF MEDIA METADATA GATHERED FROM DIVERSE SOURCES

(71) Applicant: TiVo Inc., Alviso (CA)

(72) Inventors: Todd Kulick, Mountain View, CA (US); Michael Francis Klar, Santa Clara, CA (US); Vin Chawla, El Dorado Hills, CA (US); Marcel Dubois, San Jose, CA (US); Brian Beach, Columbus, IN (US); Alain Jobart, San Jose, CA (US)

(73) Assignee: TiVo Inc., Alviso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,895

(22) Filed: Sep. 9, 2014

(65) Prior Publication Data

US 2015/0012949 A1    Jan. 8, 2015

Related U.S. Application Data

(63) Continuation of application No. 13/682,568, filed on Nov. 20, 2012, now Pat. No. 8,832,744, which is a continuation of application No. 12/465,619, filed on May 13, 2009, now Pat. No. 8,316,396.

(51) Int. Cl.
*H04N 21/462* (2011.01)
*H04N 21/431* (2011.01)
(Continued)

(52) U.S. Cl.
CPC ...... *H04N 21/4622* (2013.01); *G06F 17/30038* (2013.01); *G06F 17/3082* (2013.01); *H04N 7/17318* (2013.01); *H04N 21/23* (2013.01); *H04N 21/23109* (2013.01);
(Continued)

(58) Field of Classification Search
None
See application file for complete search history.

(56) References Cited

U.S. PATENT DOCUMENTS 8,832,744 B2   9/2014  Kulick et al.
2002/0042923 A1   4/2002  Asmussen et al.
(Continued)

FOREIGN PATENT DOCUMENTS

EP    1993052 A2   11/2008
JP    2007-142492   6/2007

OTHER PUBLICATIONS

Japan Patent Office, "First Office Action", in application No. 2012-510785, dated Apr. 2, 2013 4 pages.
(Continued)

*Primary Examiner* — Justin Shepard
(74) *Attorney, Agent, or Firm* — Wong & Rees LLP

(57) ABSTRACT

A DVR, server, or other agent correlates media metadata from diverse sources, like an EPG data provider and multiple video-on-demand (VOD) service providers. Metadata sets from different sources are compared in order to attempt to identify identical programs to which the metadata sets pertain. From at least one metadata set, information about the program that the other metadata set lacks is selected. A "canonical" data structure instance for the program is created. The information that is lacking from at least one of the metadata sources is inserted into that instance. For each source from which a program is available, the DVR stores the identity of that source on the DVR's persistent storage device in association with the canonical data structure instance for that program. The DVR receives search criteria from a user and then searches the stored canonical data structure instance for programs that satisfy the criteria.

21 Claims, 5 Drawing Sheets

(51) Int. Cl.
- *H04N 21/231* (2011.01)
- *H04N 21/23* (2011.01)
- *H04N 21/43* (2011.01)
- *G06F 17/30* (2006.01)
- *H04N 7/173* (2011.01)
- *H04N 21/2665* (2011.01)
- *H04N 21/2747* (2011.01)
- *H04N 21/482* (2011.01)
- *H04N 21/84* (2011.01)
- *H04N 21/24* (2011.01)
- *H04N 21/4147* (2011.01)
- *H04N 21/435* (2011.01)
- *H04N 21/472* (2011.01)

(52) U.S. Cl.
CPC ........ *H04N 21/23116* (2013.01); *H04N 21/24* (2013.01); *H04N 21/2665* (2013.01); *H04N 21/2747* (2013.01); *H04N 21/4147* (2013.01); *H04N 21/43* (2013.01); *H04N 21/431* (2013.01); *H04N 21/435* (2013.01); *H04N 21/47202* (2013.01); *H04N 21/482* (2013.01); *H04N 21/4828* (2013.01); *H04N 21/84* (2013.01)

(56) References Cited

U.S. PATENT DOCUMENTS

| | | |
|---|---|---|
| 2004/0221308 A1 | 11/2004 | Cuttner et al. |
| 2005/0060229 A1 | 3/2005 | Riedl et al. |
| 2006/0085826 A1 | 4/2006 | Funk et al. |
| 2007/0204299 A1 | 8/2007 | Vosseller |
| 2008/0046929 A1 | 2/2008 | Cho et al. |
| 2009/0158226 A1 | 6/2009 | Ho et al. |
| 2010/0293579 A1 | 11/2010 | Kulick et al. |
| 2013/0081075 A1 | 3/2013 | Kulick et al. |

OTHER PUBLICATIONS

Claims in Japan application No. 2012-510785, dated Apr. 2013, 4 pages.
Australian Patent Office, "First Office Action", in application No. 2009346238, dated May 13, 2013, 3 pages.
Canadian Patent Office, "First Office Action", in application No. 2,761,031, dated Oct. 31, 2013, 3 pages.
Canadian Claims in application No. 2,761,031, dated Oct. 2013, 4 pages.
Japan Patent Office, "Office Action", in application No. 2012-510785, dated Nov. 26, 2013 4 pages.
Claims in Japan application No. 2012-510785, Nov. 2013, 3 pages.
European Patent Office, "Search Report" in application No. 09844745.1, dated Mar. 3, 2014, 6 pages.
Claims in European application No. 09844745.1, dated Mar. 2014, 4 pages.
Claims in Australian Application No. 2009346238, dated May 2013, 4 pages.
International Searching Authority, "Search Report and Written Opinion" in application No. PCT/US2009/060832, dated Dec. 11, 2009, 9 pages.
Claims in PCT/US2009/060832, dated Dec. 2009, 4 pages.
Chinese Patent Office, Application No. 20098016415.2, Foreign Office Action dated Nov. 5, 2014.
Chinese Patent Office, Application No. 20098016415.2, Pending Claims as of Nov. 5, 2014.
Japanese Patent Office, Application No. 2012-510785, Foreign Office Action dated Feb. 3, 2015.
Japanese Patent Office, Application No. 2012-510785, Pending Claims as of Feb. 3, 2015.

CORRELATION OF MEDIA METADATA GATHERED FROM DIVERSE SOURCES

CROSS REFERENCE TO RELATED APPLICATIONS AND PRIORITY CLAIM

This application claims benefit as a Continuation of application Ser. No. 13/682,568, filed Nov. 20, 2012, which claims benefit as a Continuation of application Ser. No. 12/465,619, filed May 13, 2009, now U.S. Pat. No. 8,316,396, issued Nov. 20, 2012, the entire contents of the aforementioned are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

Embodiments of the invention generally relate to digital video recorders (DVRs). Embodiments of the invention relate more specifically to techniques for correlating media metadata gathered from diverse sources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Sophisticated, modern DVRs are capable of scheduling the recordings of programs that are to be televised some time in the future. If a DVR user is interested in recording all episodes of a televised series, then the DVR user can instruct his DVR to get a "season pass" for that series. In response to such an instruction, the DVR automatically determines, from electronic programming guide ("EPG") data, times at which episodes of that series are going to be televised in the future. Usually, whenever an episode of the selected series is about to be broadcasted, the DVR automatically tunes to the channel on which the episode is going to be broadcasted and records that episode on the DVR's hard disk drive. For as long as the recorded episode remains on the DVR's hard disk drive, the DVR's user can instruct the DVR to replay the episode to the user's television. Conveniently, this allows the DVR user to watch programs in which the user is interested at times other than those program's broadcasting times. The DVR user does not even need to know, beforehand, the exact times at which those programs are going to be broadcasted.

As used herein, a "program" is any content, visual and/or audible, that is presented through a television's display and/or speakers. For example, a program might be an episode of a multi-episode series, a movie, a sporting event, or a news presentation, although this is not an exclusive list of "programs." When a DVR schedules a program for future recording, the DVR attempts to add the program to a "to do" list that the DVR maintains within the DVR's own storage mechanisms. Whenever a program on the DVR's "to do" list is broadcasted, the DVR automatically records that program.

Some DVRs allow a DVR user to search for specific programs in which the DVR user might be interested. For example, in response to a DVR user's search request, a DVR might present, to the DVR user, a user interface into which the DVR user can enter criteria that programs in which the DVR user is interested ought to satisfy. The user interface might contain different user-fillable fields for different types of criteria that programs could satisfy. For example, a user interface might contain a "title" field, one or more "actors" fields, a "category" and/or "genre" field, a "year" field, a "rating" field, etc. After receiving the user-specified criteria through such a user interface, the DVR searches program metadata that the DVR obtained from the EPG data provider. Typically, the EPG-provided program metadata will indicate, for each program, the kinds of information (e.g., title, actors, category, genre, year, rating, etc.) for which the user entered criteria. The DVR determines, based on the EPG-provided program metadata, a set of to-be-broadcasted programs that are associated with program metadata that satisfies the user-specified criteria. The DVR then presents, to the DVR user, a list of to-be-broadcasted programs that are contained in the set.

For example, if a DVR user enters the word "Christopher" into an "actors" field in the user interface, but leaves the "title" field of the user interface blank, then the DVR may search EPG-provided metadata for all programs that have anyone named "Christopher" (as a first, last, or middle name) as an actor. In the EPG-provided metadata, different kinds of information are found in different metadata fields. The EPG-provided metadata for a particular program might contain multiple fields tagged with the "actor" identifier. A field tagged with the "actor" identifier is referred to as an "actor" field. Each such actor field may contain the name of an actor that appears in that program. The DVR may search EPG data for upcoming programs that are associated with metadata that contains an actor field that contains the word "Christopher." After compiling a list of such programs, and removing any duplicate entries from the list, the DVR presents the list of programs to the DVR user. The DVR user can instruct the DVR to schedule recordings of selected programs from the list as the DVR user prefers.

Significantly, if the DVR user specifies "Christopher" as an actor, rather than a title, then the DVR will not search for "Christopher" in the title field, because doing so would probably yield search results in which the DVR user is not interested (many programs with "Christopher" in the title might not feature any actor named "Christopher"). Thus, in order to perform an accurate search that is likely to yield the results in which the DVR user is most interested, the DVR benefits from the fact that the EPG-provided metadata that the DVR searches contains information that has been classified into different types (e.g., "actor" metadata, "title" metadata, etc.).

Metadata obtained from an EPG data provider typically contains information about programs that are scheduled to be broadcast on various channels in the near future. However, some DVRs are also capable of obtaining and presenting programs that are not scheduled for broadcast (e.g., over the air or through cable) on any specific channel at any specific time. Some DVRs are capable of downloading (e.g., over a data network such as the Internet) and presenting program content to a DVR user at any time that the DVR user likes, even when that program content is not going to be broadcasted on any channel in the near future (or ever). Program content that a DVR user can request and view at any time, regardless of whether that content is scheduled for broadcast on a channel, is called "video-on-demand" ("VOD") content. Unlike regular broadcasted content, VOD content typically is not presented to a DVR user or provided to a DVR until the DVR user or the DVR actually requests that VOD content. A DVR may (but does not necessarily need to) obtain or receive VOD content over a cable using the same tuner hardware that the DVR uses to obtain or receive content that is broadcasted over a channel in the more traditional manner. Thus, though VOD content and non-VOD content may be available via different distribution mechanisms, a DVR may obtain or receive VOD and non-VOD content through either the same or different interfaces.

Typically, VOD content is stored in digital form on an Internet-accessible server that some VOD service provider maintains. There may be many different VOD service providers, each with its own set of servers and each with a different set of VOD content stored on its set of servers. A particular DVR may be capable of obtaining VOD content from multiple different VOD service providers. In order to let a DVR and a DVR user know which VOD content a particular VOD service provider provides, the particular VOD service provider may store downloadable VOD metadata on the particular VOD service provider's servers. The VOD metadata may indicate various kinds of information about the VOD content that is accessible from the particular VOD service provider's servers.

A given DVR typically will only obtain program metadata from a single well-known and widely used EPG data provider. Due to this fact, the program metadata that the DVR obtains from the EPG data provider usually will conform to a DVR-expected format, regardless of the specific program to which the program metadata pertains. Usually, if the EPG-provided metadata for one program contains a particular set of fields (e.g., title, actors, category, genre, year, rating, etc.), then the EPG-provided metadata for each other program will also contain the particular set of fields (though the values of those fields will naturally vary from program to program). In other words, the "structure" of the EPG-provided metadata for each program typically will be uniform from program to program. A DVR is able to perform user-initiated program content searches with greater precision because of this structural uniformity in EPG-provided metadata. If the EPG-provided metadata were not so structurally uniform, then search results might be less precise. Referring to the example above, if the metadata associated with various programs did not contain separate "title" and "actor" fields, then the DVR would be unable to distinguish between programs that contained "Christopher" as an actor and programs that contained "Christopher" in the title when performing a search for programs that matched user-specified criteria.

As is stated above, a DVR might be capable of obtaining VOD content from diverse VOD content providers. The program metadata offered by these VOD content providers often will not have the same structure as the EPG-provided metadata; VOD content providers often feel little or no compulsion to conform the structure of their program metadata to the structure of anyone else's program metadata. The program metadata offered by one VOD content provider often will not have the same structure as the program metadata offered by another VOD content provider. Additionally, even if VOD metadata contains information such as title, actor, and genre (to name a few types of information), there is often no assurance that such information will be tagged specifically as a title, an actor, or a genre in the VOD metadata—the "type" of an information item (e.g., whether the information item is a title or an actor) in the VOD metadata is often difficult or impossible to determine from the VOD metadata alone. Although a DVR user might like to be able to search for VOD content in the same way that a DVR is able to search for regularly broadcasted content, the structural variance in VOD-provided metadata often stands as an obstacle in the way of a DVR that would otherwise permit a DVR user to search for VOD content in this manner.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
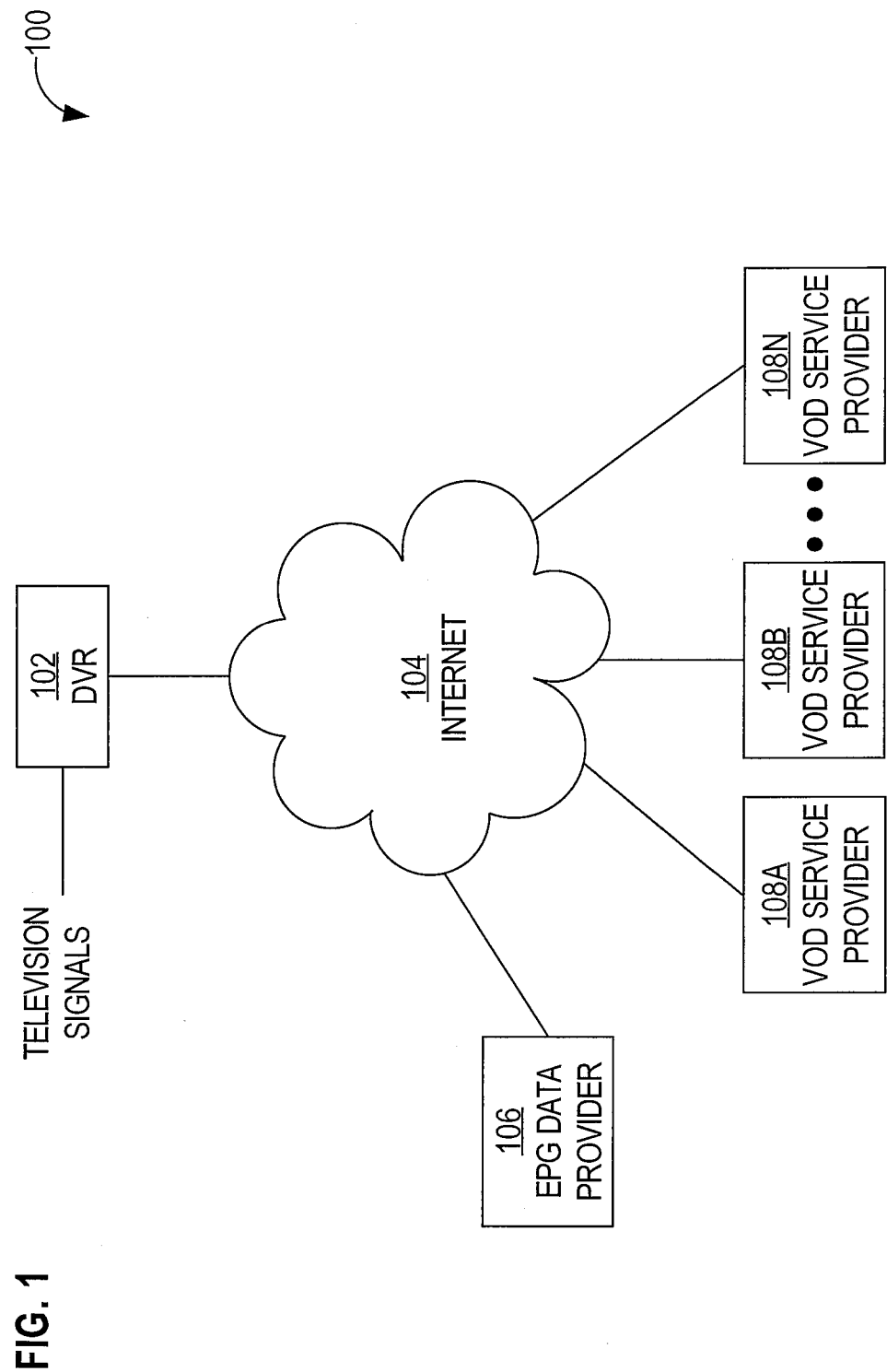
FIG. 1 is a block diagram that illustrates a system in which an embodiment of the invention may be practiced.

A method and apparatus for correlating media metadata from diverse sources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 DVR Overview
3.0 Correlating Media Metadata from Diverse Sources
4.0 Implementation Mechanisms—Hardware Overview
5.0 Extensions and Alternatives

---

1.0 General Overview

The needs identified in the foregoing Background, and other needs and objects that will become apparent for the following description, are achieved in the present invention, which comprises, in one aspect, a technique for correlating program metadata from diverse sources.

According to one embodiment of the invention, a DVR obtains separate sets of program metadata from separate sources. For example, the DVR might obtain a first set of program metadata from an EPG data provider, a second set of program metadata from a first VOD service provider, and a third set of program metadata from a second VOD service provider. Under such circumstances, the first set of program metadata specifies information about programs that are going to be broadcasted on various channels in the near future, the second set of program metadata specifies information about programs that are stored on the first VOD service provider's servers, and the third set of program metadata specifies information about programs that are stored on the second VOD service provider's servers. The structure of the sets of program metadata that the DVR obtains from these various sources differs. For example, information of a particular type (e.g., title, actor, category, genre, year, rating, etc.) in one set of metadata might be tagged or labeled differently (or not at all) from information of the same type in another set of metadata. For another example, program metadata that is from one of the sources might contain a type of information (e.g., title, actor, category, genre, year, rating, etc.) about a particular program that the program metadata from another of the sources does not contain, even though the program metadata from each of the sources actually pertains to the same particular program.

According to one embodiment of the invention, after obtaining the separate sets of metadata from the separate sources, the DVR automatically compares the sets of metadata in order to attempt to identify identical programs to which two or more of the sets of metadata pertain. According to one embodiment of the invention, in making this comparison, the DVR searches for similarities between the information contained in one set of metadata and the information contained in another set of metadata, even if those sets of metadata are tagged or labeled differently, and even if one set of metadata contains at least some information that the other set of metadata does not. In response to a determination that program metadata as represented in a set of metadata from a first source is sufficiently similar to program metadata as represented in a different set of metadata from a second source, the DVR concludes that the sets of program metadata from the first and second sources actually refer to the same program.

According to one embodiment of the invention, in response to determining that two separate sets of program metadata actually pertain to the same program, the DVR selects, from at least one set of program metadata, information about the program that the other set of program metadata lacks. The DVR generates an instance of a "canonical" data structure for the program and inserts, into that instance, the information that is lacking from at least one of the metadata sources. In the canonical data structure instance, each of the information items from the metadata sources is labeled and/or stored according to a specified schema, so that the "type" (e.g., title, actor, category, genre, year, rating, etc.) of each of the information items in the canonical data structure is known. For example, the canonical data structure instance may be stored as an XML document (containing XML tags that indicate information types) that conforms to a specified XML schema. The DVR then stores this canonical data structure instance on the DVR's persistent storage device (e.g., one or more hard disk drives or solid state drives) in association with a unique program identifier of the program to which the sets of metadata actually (though perhaps not expressly) pertain.

In one embodiment of the invention, for each source from which that program is available, the DVR stores the identity of that source on the DVR's persistent storage device in association with the canonical data structure instance for that program. For example, if the same program is available from both a first VOD service provider and a second VOD service provider, then the DVR may associate the canonical data structure instance for that program with both the first VOD service provider and the second VOD service provider. Likewise, if a program that is going to be broadcasted on a specific channel at a specific time also is available from a VOD service provider, then the DVR may associate the canonical data structure instance for that program with both the channel/time and the VOD service provider.

According to one embodiment of the invention, in response to a DVR user's request to search for programs that satisfy criteria specified by that DVR user, the DVR receives the criteria from the DVR user and then searches the stored canonical data structure instances for programs that satisfy the criteria. The DVR composes a list of programs that satisfy the criteria, and then presents the list to the DVR user. Significantly, the list may include both (a) programs that are to-be-broadcasted on a specific channel at a specific time in the future and (b) VOD programs that is available from a VOD service provider at the user's discretion. Under such circumstances, the DVR user benefits from the ability to search for programs that originate from a variety of sources with just one search made through just one user interface. Due to the DVR's generation and completion of the canonical data structure instances based on metadata comparison, the DVR user can benefit in this way even if the program metadata obtained from some of those sources is sparse, incomplete, or lacking in specificity.

In other aspects, embodiments of the invention encompass a computer apparatus and a computer-readable storage medium configured to carry out the foregoing technique.

2.0 DVR Overview

Figure 2A:
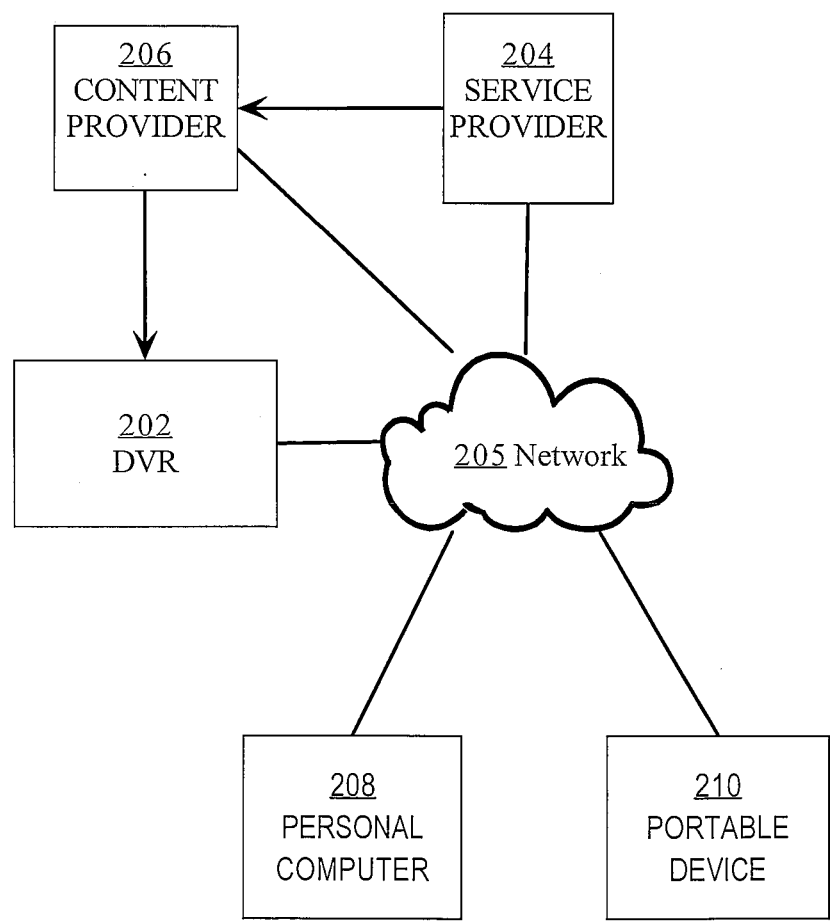
FIG. 2A illustrates an example system in which an embodiment of the invention may be implemented.

FIG. 2A illustrates an example system in which an embodiment of the invention may be implemented. The system contains at least one client device such as DVR 202 which is communicatively coupled to network 205 through any communication interface, such as an Ethernet interface or wireless communications port. The functionality of a DVR is typified in U.S. Pat. No. 6,233,389, which is owned by the Assignee and is hereby incorporated by reference. The system also includes service provider 204, content provider 206, personal computer 208 and portable device 210.

Personal computer 208 may be a personal computing device, such as a desktop computer or laptop computer, and is also coupled to network 205 through any communications interface, including wireless. Portable device 210 may be any handheld computing device, cellular phone, portable media player, or any other portable device capable of displaying multimedia content and may be coupled to network 205 through any communications interface, including wireless. DVR 202, personal computer 208, and portable device 210 each communicate with service provider 204 through network 205. In another embodiment, DVR 202, personal computer 208, and portable device 210 each communicate with content provider 210 through network 205.

Network 205 may be implemented by any medium or mechanism that provides for the exchange of data between devices in the communication system. Examples of network 205 include, without limitation, a network such as a Local Area Network (LAN), Wide Area Network (WAN), the Internet, one or more terrestrial, satellite or wireless links, etc. Alternatively or additionally, any number of devices connected to network 205 may also be directly connected to each other through a communications link.

In one embodiment, content provider 206 provides broadcast program content to DVR 202 via cable, satellite, terrestrial communication, or other transmission method. Broadcast program content may include any multimedia content such as: audio, image, or video content. In another embodiment, content provider 206 provides multimedia content, such as any downloadable content, through network 205 to DVR 202, personal computer 208, or portable device 210.

In one embodiment, DVR 202 communicates with service provider 204, which provides program guide data, graphical resources (such as fonts, pictures, etc.), service information, software, advertisements, event identification data, and other forms of data enable DVR 202 to operate independently of service provider 204 to satisfy user interests. In another embodiment, DVR 202, personal computer 208, and portable device 210 can communicate with each other to transfer content, metadata, or any other data through network 205, communication connection, or any local network.

In another embodiment, content provider 206 may provide, to service provider 204, content data or any metadata, including promotional data, icons, web data, and other information. Service provider 204 may then interpret the metadata and provide the content data metadata to DVR 202, personal computer 208, or portable device 210.

Figure 2B:
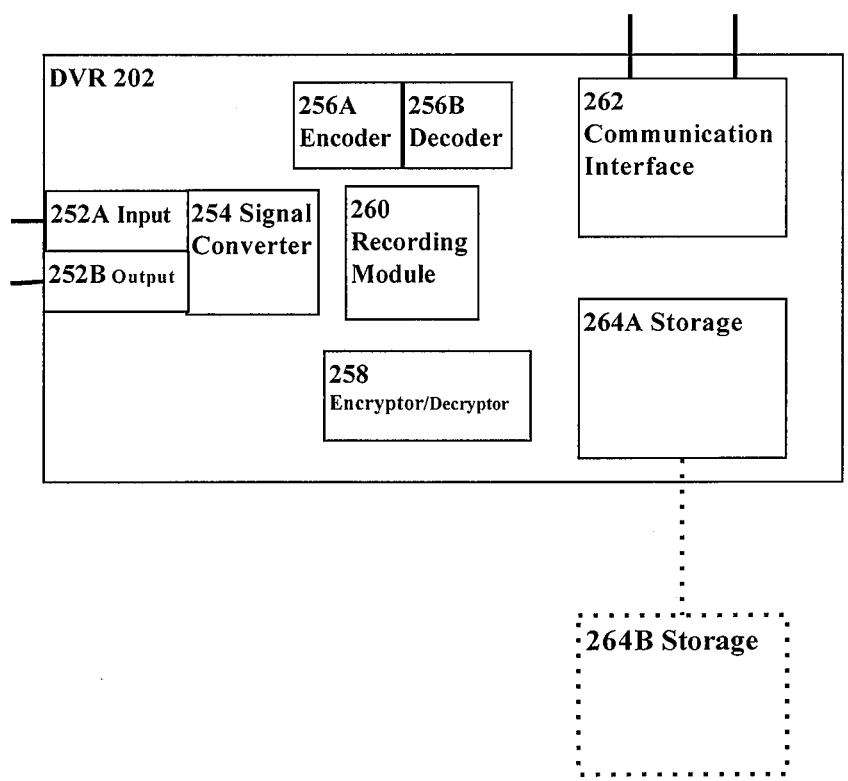
FIG. 2B is a block diagram illustrating a general overview of the components of a Digital Video Recorder (DVR), according to an embodiment of the invention.

Referring to FIG. 2B, in an embodiment, DVR 202 generally comprises a plurality of components, signified by Signal Converter 254, that are necessary to digitize an analog television signal and convert it into a digital data stream or accept a digital data stream. An example of the internal structure and operation of a DVR is further described in U.S. Pat. No. 6,233,389.

DVR 202 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

Recording Module 260 records the incoming data stream by storing the digital data stream on at least one storage facility, signified by Storage 264A/264B that is designed to retain segments of the digital data stream. Storage 264A/264B may be one or more non-volatile storage devices (e.g., hard disk, solid state drive, USB external hard drive, USB external memory stick, USB external solid state drive, network accessible storage device, etc.) that are internal 264A and/or external 264B. A Signal Converter 254 retrieves segments of the data stream, convert the data stream into an analog signal, and then modulate the signal onto a RF carrier, via Output 252B, through which the signal is delivered to a standard TV set. Output 252B may alternatively deliver a digital signal to a TV set or video monitor. For example, DVR 202 may utilize a Digital Visual Interface port (DVI) for sending digital signals to a TV via a DVI cable.

DVR 202 also includes a Communication Interface 262, through which the DVR 202 communicates with Network 205 via Ethernet, wireless network, modem, or other communications standard. Further, DVR 202 may be integrated into a TV system such that the components described above are housed in a TV set capable of performing the functions of each component of DVR 202.

In another embodiment, DVR 202 generally comprises a plurality of components necessary to receive, record, store, transfer and playback digital data signals from a plurality of sources, such as a PC, a DVR, a service provider, or content server. DVR 202 can transfer digital data signals to another DVR or PC. DVR 202 may encode or decode digital signals via Encoder 256A and Decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 202 can also encrypt or decrypt digital data signals using Encryptor/Decryptor 258 for storage, transfer or playback of the digital data signals.

In one embodiment, DVR 202 communicates with Service Provider 204, which provides program guide data, graphical resources such as brand icons and pictures, service information, software programs, advertisements, and other forms of data that enable DVR 202 to operate independently of the Service Provider 204 to perform autonomous recording functions. Communication between DVR 202 and Service Provider 204 utilizes a secure distribution architecture to transfer data between the DVR 202 and the Service Provider 204 such that both the service data and the user's privacy are protected.

3.0 Correlating Media Metadata from Diverse Sources

FIG. 1 is a block diagram that illustrates a system 100 in which an embodiment of the invention may be practiced. Embodiments of the invention may additionally or alternatively be practiced in systems that contain more, fewer, or different components than those illustrated in FIG. 1.

System 100 comprises a DVR 102, Internet 104, EPG data provider 106, and VOD service providers 108A-N. DVR 102, EPG data provider 106, and VOD service providers 108A-N are communicatively coupled to Internet 104. DVR 102 sends data to, and receives data from, EPG data provider 106 and VOD service provider 108A-N through Internet 104. Additionally, DVR 102 receives broadcasted television signals that represent scheduled programs, typically through a medium other than the Internet. For example, DVR 102 may receive broadcasted television signals through cable and/or over the air.

In one embodiment of the invention, DVR 102 periodically receives EPG metadata from EPG data provider. The EPG metadata identifies the programs that will be broadcasted (e.g., through cable and/or over the air) on various channels at various times. In one embodiment of the invention, each unique program identified in the EPG data has a unique identifier that no other program has. Furthermore, in one embodiment of the invention, each unique episode of a multi-episode series has a unique identifier that no other episode of that series (or any other series) has. In one embodiment of the invention, EPG data provider 106 transmits such identifiers within the EPG data to DVR 102 over Internet 104. EPG data provider 106 may be implemented as one or more servers. In one embodiment of the invention, the EPG data is formatted as an XML document that conforms to an XML schema that DVR 102 is configured to interpret.

Each of VOD service providers 108A-N may be implemented as a separate set of one or more servers. Each of VOD service providers 108A-N is owned and operated by a separate person or organization. VOD service providers 108A-N store programs that DVR 102 may download over Internet 104, typically in response to the request of a user of DVR 102. Usually, DVR 102 will play (e.g., via a television screen connected to DVR 102) the programs that DVR 102 receives from any of VOD service providers 108A-N as DVR 102 receives those programs; thus, in one embodiment of the invention, DVR 102 plays programs that VOD service providers "stream" to DVR 102 over Internet 104 (e.g., using Transmission Control Protocol and Internet Protocol). Additionally or alternatively, in one embodiment of the invention, DVR 102 can record such downloaded program on a persistent storage device for later viewing by a user of DVR 102. In one embodiment of the invention, each of VOD service providers 108A-N is associated with a different Uniform Resource Locator that DVR 102 uses to access that VOD service provider.

Although each of VOD service provider 108A-N stores programs that DVR 102 can download via Internet 104, in one embodiment of the invention, the set of programs that each of VOD service providers 108A-N stores is at least slightly different. Thus, VOD service provider 108A might store some programs that VOD service provider 108B does not, and vice-versa. In one embodiment of the invention, each of VOD service providers 108A-N additionally stores program metadata that indicates (potentially among other information) information about the programs that the VOD service provider stores. In one embodiment of the invention, DVR 102 requests and receives this program metadata from VOD service providers 108A-N, and uses this program metadata to generate and display, to a user of DVR 102, a menu that indicates which VOD programs are available for download and viewing from VOD service providers 108A-N.

The program metadata that one of VOD service providers 108A-N stores might (and typically does) vary in format from the program metadata that any other one of VOD service providers 108A-N stores. Even if all of the VOD service providers 108A-N store program metadata in the form of an XML document (and one or more of VOD service providers 108A-N might store program metadata in some other format), the XML schemas to which those XML documents conform (if any) vary differ from XML document to XML document. Typically, none of the program metadata stored by any of VOD service providers 108A-N will conform to the same XML schema to which the EPG metadata, which EPG data provider 106 provides, conforms. Typically, none of the program metadata stored by any of VOD service providers 108A-N will identify programs by the unique identifiers by which programs are identified in the EPG metadata that EPG data provider 106 provides; often, the operators of VOD service providers 108A-N will be unaware of such identifiers.

Although the EPG metadata that EPG metadata provider 106 provides to DVR 102 usually will contain detailed information about programs that are scheduled to be broadcast, the program metadata that VOD service providers 108A-N store often will be more sparse and contain fewer details. For example, the EPG metadata might indicate, for an episode of a series, at least (a) the unique identifier for that episode, (b) the title of that episode, (c) the title of the series to which that episode belongs, (d) the genre (e.g., drama, comedy, horror, adventure, documentary, etc.) to which the episode belongs, (e) the rating (e.g., TV-Y, TV-Y7, TV-G, TV-PG, TV-14, TV-MA, etc.) of the episode (if any), (f) the year in which the episode was originally broadcast, and (g) the names of one or more actors who appear in that episode. In the EPG metadata, each of these information items may be delimited by XML tags that specify the "type" of the information item that is enclosed by those XML tags. As a result, DVR 102 is able to determine, with relative ease, which part of the EPG metadata indicates a program's episode title, and which part of the EPG metadata indicates a program's genre, for example. In contrast to the EPG metadata, the program metadata that VOD service providers 108A-N provide might omit many of the details that are included in the EPG metadata. The program metadata that VOD service providers 108A-N provide might not clearly indicate the "types" of the information items that are specified in that program metadata.

According to one embodiment of the invention, DVR 102 (or some other agent or automated mechanism acting on behalf of DVR 102) correlates the program metadata received from EPG data provider 106 and VOD service providers 108A-N in order to (a) identify the types of information items specified in program metadata that does identify those types and (b) "fill in" program details that might be omitted from one or more program metadata sources. In one embodiment of the invention, DVR 102 (or some other agent or automated mechanism acting on behalf of DVR 102) compares the program metadata received from each metadata source in order to determine similarities between the programs to which that program metadata pertains. Based on this comparison, DVR 102 (or some other agent or automated mechanism acting on behalf of DVR 102) attempts to label each program with the unique program identifier that is discussed above, even if the metadata that pertains to that program does not expressly identify that program.

For example, DVR 102 might determine that words in program metadata received from VOD service provider 108A are highly similar or identical to a title of a particular program that is identified in the EPG metadata. Additionally, DVR 102 might determine that words in the program metadata received from VOD service provider 108A are highly similar or identical to names of actors that appear in the particular program, as indicated in the EPG metadata. Consequently, due to this similarity, DVR 102 may reasonably conclude that the program metadata received from VOD service provider 108A actually pertains to the same particular program to which the similar EPG metadata pertains. In response to this conclusion, DVR 102 may enhance the program metadata from VOD service provider 108A so that the program metadata includes the unique program identifier and other details that are present in the corresponding EPG data. DVR 102 may label each recognized but unlabeled information item in the VOD program metadata by type.

Figure 3:
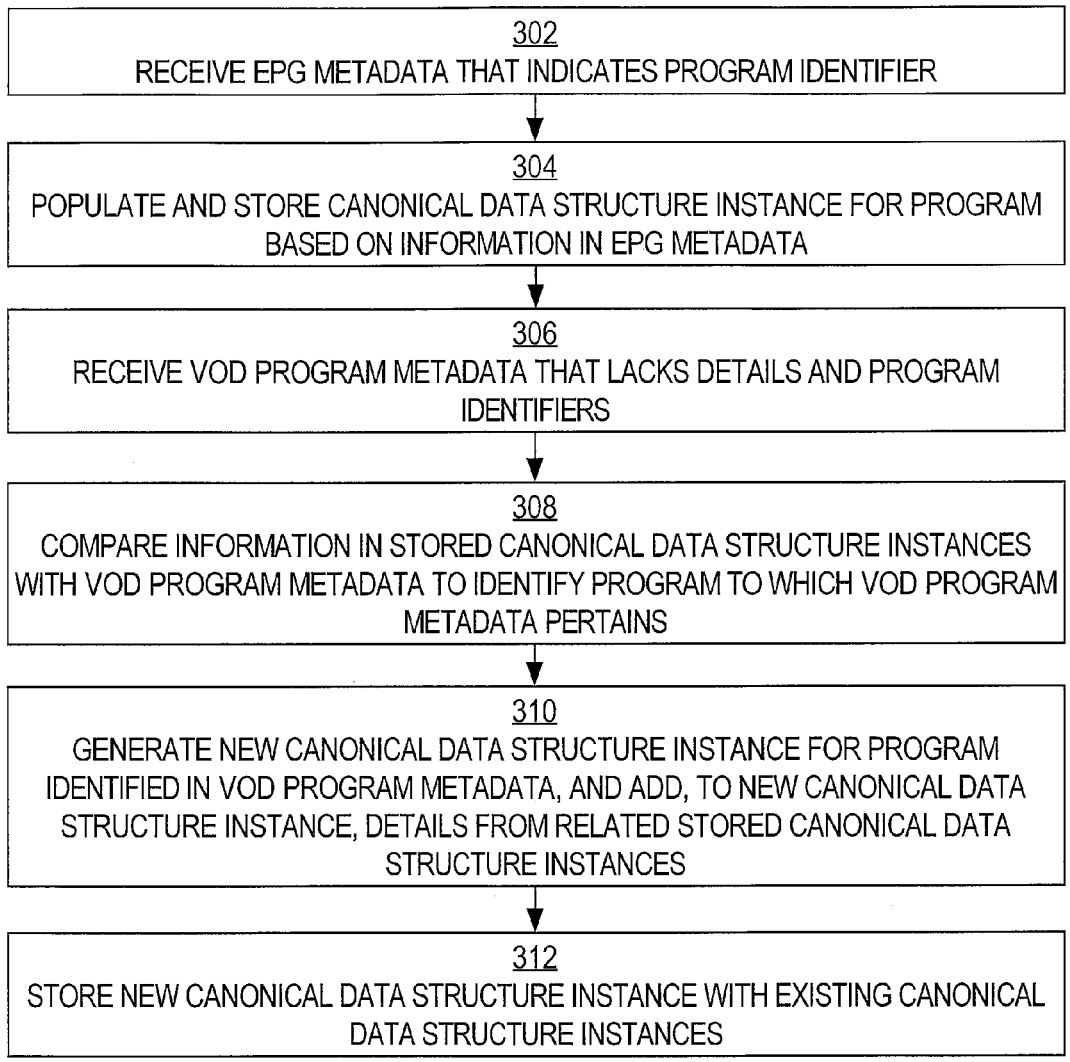
FIG. 3 is a flow diagram that illustrates a technique for correlating media metadata from diverse sources, according to an embodiment of the invention.

FIG. 3 is a flow diagram that illustrates a technique for correlating media metadata from diverse sources, according to an embodiment of the invention. In alternative embodiments of the invention, techniques for correlating media metadata from diverse sources may include more, fewer, or different steps than those shown in FIG. 3.

Referring now to FIG. 3, in block 302, a DVR receives EPG metadata from an EPG data provider. The EPG metadata indicates the channels on which scheduled programs (which the DVR can receive as broadcasted (e.g., over the air, satellite, Internet, or via cable) television or multimedia signals) are going to be broadcasted or available, and the dates and times at which those scheduled programs are going to be broadcasted or available. As is discussed above, in one embodiment of the invention, for each program (which may be an episode of a multi-episode series), the EPG metadata indicates a program identifier that only identifies that program. Each program has a unique identifier. Although this identifier may originate from the EPG data provider, in an alternative embodiment of the invention, this identifier originates from a source other than the EPG data provider. For example, an intermediate server may intercept the EPG metadata and enhance the EPG metadata with added program identifiers before forwarding the identifier-enhanced metadata on to the DVR.

In block 304, the DVR stores the EPG metadata on the DVR's persistent storage device. In doing so, the DVR may examine tags and/or labels in the EPG metadata to determine the types of various information items that are in the metadata. For example, the DVR may determine that the information enclosed within "series" tags indicates a title of a multi-episode series to which the program belongs. For another example, the DVR may determine that the information enclosed within "episode" tags indicates a title of an episode that the program represents. For another example, the DVR may determine that the information enclosed within "ID" tags indicates a unique identifier for that program.

The EPG metadata typically contains information for multiple programs. For each such program, the DVR populates an instance of a "canonical" data structure for that program with the metadata information items that pertain to that program. For example, the canonical data structure instance may contain a "series title" field into which the DVR inserts the series title as obtained from the EPG metadata. For another example, the canonical data structure instance may contain a "genre" field into which the DVR inserts a genre into which the program fits, as obtained from the EPG metadata. In one embodiment of the invention, the structure of the canonical data structure instances does not vary from program to program, although the values inserted into the fields of the instances of the canonical data structure do vary; thus, in one embodiment of the invention, all instances of the canonical data structure have the same fields.

The DVR may obtain EPG metadata from the EPG data provider periodically. Each time, the storehouse of canonical data structure instances stored at the DVR may grow. As will be seen below, the DVR may use these canonical data structure instances to identify and enhance program metadata that the DVR receives from VOD service providers.

In block 306, the DVR receives program metadata from a VOD service provider. Typically, the DVR receives such program metadata in response to a DVR user's request for a listing of content that the VOD service provider provides—the content that the VOD service provider stores. The program metadata received from the VOD service provider will often not be as clearly labeled or have as much detailed information about programs as the EPG metadata is.

In block 308, the DVR compares the program information in the VOD program metadata with the canonical data structure instances. The VOD program metadata may contain program information for multiple different programs. Based on similarities between information in the VOD program metadata and the information in the canonical data structure instances, the DVR attempts to identify the programs to which the VOD program metadata pertains (the VOD metadata might not explicitly identify these programs). For example, based on similarities between titles and actors in both the VOD program metadata for a particular program and a particular canonical data structure instance, the DVR may determine that the particular program to which the VOD program metadata pertains is actually the same program to which the particular canonical data structure instance pertains. The DVR may use various heuristics and comparison techniques to attempt to identify similarities between programs. In one embodiment of the invention, if the quantified similarities between the information in a canonical data structure instance and the information in VOD program metadata exceed a specified threshold, then the DVR deems the canonical data structure instance and the VOD program metadata to pertain to the same program.

In block 310, in response to determining that the VOD program metadata pertains to the same program to which a particular canonical data structure instance already pertains, the DVR creates and populates a new canonical data structure instance for the program to which the VOD program metadata pertains. Based on similarities between information items in the old canonical data structure instance and the VOD program metadata, the DVR determines the types of the information items in the VOD program metadata. For example, if the old canonical data structure instance indicates a particular episode title in an "episode title" field, and if the VOD program metadata contains an information item that matches the value of the "episode title" field, then the DVR may populate the "episode title" field of the new canonical data structure with that information item.

Additionally, in one embodiment of the invention, if the old canonical data structure instance contains values for any fields whose values are not contained in the VOD program metadata, then the DVR populates the corresponding fields of the new canonical data structure instance with the values from the old canonical data structure instance. Thus, using EPG metadata, the DVR may "complete" partially complete metadata received from a VOD service provider. Among the values that the DVR may "carry over" into the new canonical data structure instance is the unique program identifier, which probably is not specified in the VOD program metadata.

Some of the values in the old canonical data structure instance (containing the EPG metadata values) and the new canonical data structure instance (containing the VOD program metadata values) may differ even though the old and new canonical data structure instances pertain to the same program. For example, one field of the canonical data structure might be a field that indicates the source of the program. In one instance, the value of this field might indicate a cable media provider or an over-the-air media provider, while in the other instance, the value of this field might indicate a URL of a VOD service provider's server. Information that does not pertain to VOD program content may be omitted from the canonical data structure instance that contains values for VOD program content. For example, under some circumstances, a canonical data structure instance for a VOD program might not contain values pertaining to a channel on which the program will be broadcasted, or a date or time at which the program will be broadcasted, if the VOD program is available from the VOD service provider at any time.

In block 312, the DVR stores the new canonical data instance (created and populated in block 310) on the DVR's persistent storage device. Thus, the new canonical data structure instance becomes part of the DVR's storehouse of canonical data structure instances that the DVR may use in the future to identify programs to which VOD program metadata from other VOD service providers pertains. Thus, while in one embodiment of the invention the DVR uses EPG metadata to identify and complete partially complete VOD program metadata, in one embodiment of the invention, the DVR additionally or alternatively uses details from one VOD service provider's metadata to identify and complete any partially complete metadata from another VOD service provider.

When a DVR user instructs the DVR to present a list of program content that is available through the DVR, the DVR may generate such a list based on the canonical data structure instances that the DVR has stored. The list may contain references to both (a) programs that are scheduled for broadcast on specified channels at specific dates and times and (b)

programs that the DVR can download and/or stream from a VOD service provider. Thus, programs from diverse media sources may be presented to the DVR user as a single comprehensive list in a user interface. In order to simplify the available program list, the DVR may optionally omit multiple references to the same program if the same program is available from multiple different sources. The DVR may determine that two programs are the same based on the unique program identifiers that are stored in the canonical data structure instances for those programs.

Additionally, in response to a DVR user's request to search for programs that satisfy DVR user-specified criteria (e.g., all programs that have a particular word in the title, or all programs in which a particular actor appears), the DVR may search for those programs by determining the set of canonical data structure instances in which the values of the relevant fields (e.g., title, actor, etc.) satisfy the DVR user-specified criteria. The DVR may present a list of criteria-matching programs that contain programs from diverse media sources (such as cable television signals, over-the-air television signals, and multiple different VOD service providers). Again, in order to simplify the criteria-matching program list, the DVR may optionally omit multiple references to the same program if the same program is available from multiple different sources.

Although certain steps of the technique described above are described as being performed by a DVR, in alternative embodiments of the invention, one or more of the steps may be performed on behalf of the DVR by some mechanism that is external to the DVR. For example, a server that is external from the DVR, and with which the DVR communicates via the Internet, may mediate communications between the DVR and the EPG data provider and the VOD service providers. The server may intercept metadata from the EPG data provider and the VOD service providers. The server may generate, populate, and store canonical data structure instances in the manner described above, thereby sparing the DVR from performing these tasks. In one embodiment of the invention, when a DVR user instructs a DVR to perform a search for programs that match specified criteria, the DVR instructs the server to perform this search on behalf of the DVR. The DVR may then present, to the DVR user, search results that the DVR receives from the server.

As is discussed above, in one embodiment of the invention, a DVR (or server or mechanism acting on behalf of the DVR) generates canonical data structure instances for programs that are at least partially identified within VOD program metadata from VOD service providers. As is discussed above, in one embodiment of the invention, EPG metadata from an EPG data provider, and/or other VOD program metadata (from other VOD service providers) is used to "fill in" and complete details that might be omitted from partial metadata received from a VOD service provider. Additionally or alternatively, in one embodiment of the invention, additional media-correlative information that is present within an existing canonical data structure instance is similarly added to the canonical data structure instances generated for programs to which VOD program metadata pertains.

Before or after a canonical data structure instance is stored on a DVR (or at another server), a human agent may enhance the information in the canonical data structure instance by adding, to that instance, information that indicates a correlation between that instance's program and one or more other instance's programs. For example, if a particular program features a "dark hero" (a protagonist whose actions might be considered to be less than righteous), then a human agent might add, to the canonical data structure for that instance, information that indicates that the particular program features a "dark hero." When the same program becomes available from a VOD service provider, the information that indicates that the particular program features a "dark hero" will also be copied into the canonical data structure instance for the program made available from the VOD service provider, using the techniques described above. Thus, even if VOD metadata for a program does not include human agent-added attributes such as "dark hero," in one embodiment of the invention, the new canonical data structure instance for that program will automatically include those attributes as long as an existing canonical data structure instance for the same program already indicates those attributes. Such attributes may be accorded a separate field or multiple fields in the canonical data structure.

In one embodiment of the invention, the DVR provides a search feature whereby programs that have similar human agent-added attributes (such as "dark hero") are presented to a DVR user as being programs that are related due to their possession of those attributes. For example, a DVR user might instruct the DVR to search for a program that has a particular title. In response to the DVR user's search request, the DVR may return a list of programs (both traditionally broadcast and VOD provided) that have the particular title. Additionally, the DVR may return a list of programs (including those that do not have the particular title) that have human agent-added attributes that are the same as or similar to those that are specified in the canonical data structure instances of the programs that have the particular title. Such human agent-added attributes might be in addition to those specified in any EPG metadata received from any EPG data provider.

4.0 Implementation Mechanisms—Hardware Overview

Figure 4:
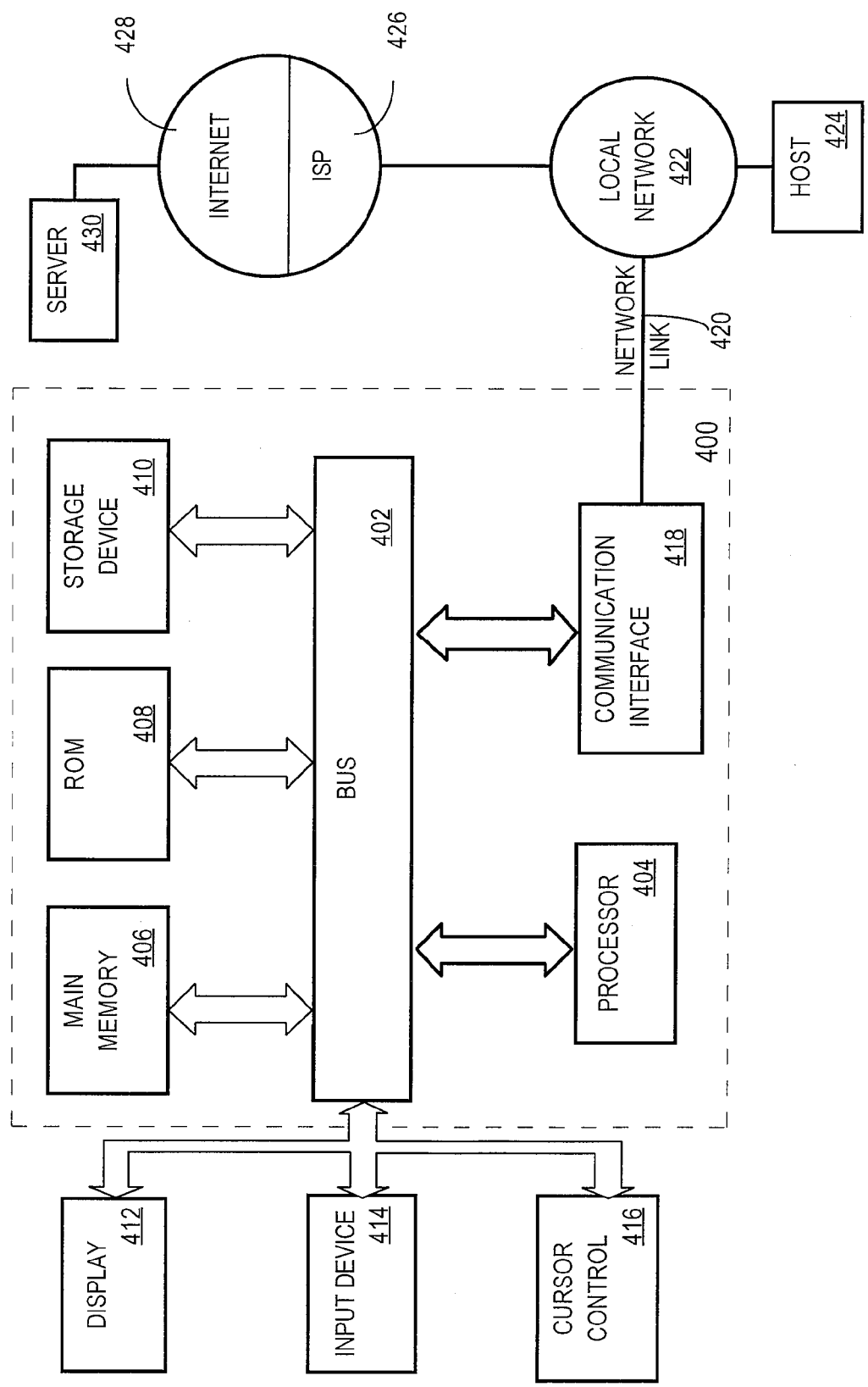
FIG. 4 is a block diagram that illustrates an example of a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for selecting a frame of a multi-frame video program for display in accordance with a selected trick play mode of a DVR. According to one embodiment of the invention, selecting a frame of a multi-frame video program for display in accordance with a selected trick play mode of a DVR is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although some embodiments of the invention discussed above relate to using correlated metadata in order to present lists of programs that contains both VOD and non-VOD programs, additional embodiments of the invention include embodiments whereby such correlated metadata is also used to schedule recordings of non-VOD programs and/or bookmark VOD programs (possibly for later acquisition by the DVR and/or viewing by the DVR user). For example, based on a DVR user's activity relative to one or more VOD programs, the DVR may automatically schedule the recording of one or more non-VOD programs based on metadata that has been correlated between the one or more VOD programs and the one or more non-VOD programs. For another example, based on a DVR user's activity relative to one or more non-VOD (e.g., traditionally time-scheduled and broadcasted) programs, the DVR may automatically bookmark (to draw the user's attention to) one or more VOD programs based on based on metadata that has been correlated between the one or more VOD programs and the one or more non-VOD programs. The metadata may be correlated using techniques described herein.

What is claimed is:

1. A method, comprising:
   storing first metadata describing multimedia content available via a media source;
   receiving second metadata from an external media source, the second metadata describing multimedia content available from the external media source;
   determining information is included in the first metadata that is not included in the second metadata;
   creating a combined metadata that includes the first metadata and at least a portion of the second metadata based at least in part on the determined information;
   causing to be displayed a list of multimedia content using the combined metadata, two or more of the multimedia content in the list of multimedia content displayed as available from two or more different media sources according to the combined metadata, the two or more different media sources including any combination of: broadcast source, internet source, video on demand source, or locally stored source;

wherein the method is performed by at least one device comprising a processor.

2. The method of claim 1, further comprising:

determining that third metadata from a second external media source includes information that refers to a particular multimedia content described by the combined metadata, and that the information that refers to the particular multimedia content is not included in the combined metadata;

in response to determining that the third metadata includes the information that refers to the particular multimedia content, updating the combined metadata with the information that refers to the particular multimedia content included in the third metadata and adding the second external media source as a source for the particular multimedia content.

3. The method of claim 1, further comprising:

determining that third metadata from a second external media source includes information that refers to a particular multimedia content described by the combined metadata, and that the information that refers to the particular multimedia content is included in the combined metadata;

in response to determining that the third metadata includes the information that refers to the particular multimedia content, adding the second external media source as a source for the particular multimedia content in the combined metadata.

4. The method of claim 1, further comprising:

receiving user input specifying search criteria;

causing the list of multimedia content to be displayed in response to the received search criteria.

5. The method of claim 1, further comprising:

receiving user input specifying search criteria;

causing the list of multimedia content to be displayed in response to the received search criteria;

in response to user input selecting particular multimedia content for download or viewing from the list, including data indicating that the particular multimedia content was selected in the combined metadata.

6. The method of claim 1, further comprising:

receiving user input specifying search criteria;

causing the list of multimedia content to be displayed in response to the received search criteria;

wherein the displayed list of multimedia content displays particular descriptive criteria for particular multimedia content;

in response to user input selecting, from the displayed list, to search for the particular descriptive criteria, of which at least one is an actor, category, genre, year, or rating, including the particular descriptive criteria in the combined metadata.

7. The method of claim 1, further comprising:

receiving first user input that selects the particular multimedia content;

displaying descriptive information about the particular multimedia content;

in response to second user input selecting search criteria from the descriptive information, of which at least one is an actor, category, genre, year, or rating, including the search criteria in the combined metadata.

8. A non-transitory computer-readable medium storing instructions for scheduling a recording of a broadcasted program, wherein the instructions, when executed by one or more processors, cause the one or more processors to perform:

storing first metadata describing multimedia content available via a media source;

receiving second metadata from an external media source, the second metadata describing multimedia content available from the external media source;

determining information is included in the first metadata that is not included in the second metadata;

creating a combined metadata that includes the first metadata and at least a portion of the second metadata based at least in part on the determined information;

causing to be displayed a list of multimedia content using the combined metadata, two or more of the multimedia content in the list of multimedia content displayed as available from two or more different media sources according to the combined metadata, the two or more different media sources including any combination of: broadcast source, internet source, video on demand source, or locally stored source.

9. The non-transitory computer-readable medium of claim 8, wherein the instructions, when executed by the one or more processors, further cause the one or more processors to perform:

determining that third metadata from a second external media source includes information that refers to a particular multimedia content described by the combined metadata, and that the information that refers to the particular multimedia content is not included in the combined metadata;

in response to determining that the third metadata includes the information that refers to the particular multimedia content, updating the combined metadata with the information that refers to the particular multimedia content included in the third metadata and adding the second external media source as a source for the particular multimedia content.

10. The non-transitory computer-readable medium of claim 8, wherein the instructions, when executed by the one or more processors, further cause the one or more processors to perform:

determining that third metadata from a second external media source includes information that refers to a particular multimedia content described by the combined metadata, and that the information that refers to the particular multimedia content is included in the combined metadata;

in response to determining that the third metadata includes that information that refers to the particular multimedia content, adding the second external media source as a source for the particular multimedia content in the combined metadata.

11. The non-transitory computer-readable medium of claim 8, wherein the instructions, when executed by the one or more processors, further cause the one or more processors to perform:

receiving user input specifying search criteria associated with multimedia content;

causing the list of multimedia content to be displayed in response to the received search criteria.

12. The non-transitory computer-readable medium of claim 8, wherein the instructions, when executed by the one or more processors, further cause the one or more processors to perform:

receiving user input specifying search criteria;

causing the list of multimedia content to be displayed in response to the received search criteria;

in response to user input selecting particular multimedia content for download or viewing from the list, including data indicating that the particular multimedia content was selected in the combined metadata.

13. The non-transitory computer-readable medium of claim 8, wherein the instructions, when executed by the one or more processors, further cause the one or more processors to perform:

receiving user input specifying search criteria;

causing the list of multimedia content to be displayed in response to the received search criteria;

wherein the displayed list of multimedia content displays particular descriptive criteria for particular multimedia content;

in response to user input selecting, from the displayed list, to search for the particular descriptive criteria, of which at least one is an actor, category, genre, year, or rating, including the particular descriptive criteria in the combined metadata.

14. The non-transitory computer-readable medium of claim 8, wherein the instructions, when executed by the one or more processors, further cause the one or more processors to perform:

receiving first user input that selects the particular multimedia content;

displaying descriptive information about the particular multimedia content;

in response to second user input selecting search criteria from the descriptive information, of which at least one is an actor, category, genre, year, or rating, including the search criteria in the combined metadata.

15. An apparatus, comprising:

a storing subsystem, implemented at least partially in hardware, that stores first metadata describing multimedia content available via a media source;

a receiving subsystem, implemented at least partially in hardware, that receives second metadata from an external media source, the second metadata describing multimedia content available from the external media source;

a subsystem, implemented at least partially in hardware, that determines information is included in the first metadata that is not included in the second metadata;

a subsystem, implemented at least partially in hardware, that creates a combined metadata that includes the first metadata and at least a portion of the second metadata based at least in part on the determined information;

a subsystem, implemented at least partially in hardware, that causes to be displayed a list of multimedia content using the combined metadata, two or more of the multimedia content in the list of multimedia content displayed as available from two or more different media sources according to the combined metadata, the two or more different media sources including any combination of: broadcast source, internet source, video on demand source, or locally stored source.

16. The apparatus of claim 15, further comprising:

a subsystem, implemented at least partially in hardware, that determines that third metadata from a second external media source includes information that refers to a particular multimedia content described by the combined metadata, and that the information that refers to the particular multimedia content is not included in the combined metadata;

a subsystem, implemented at least partially in hardware, that, in response to determining that the third metadata includes the information that refers to the particular multimedia content, updates the combined metadata with the information that refers to the particular multimedia content included in the third metadata and adding the second external media source as a source for the particular multimedia content.

17. The apparatus of claim 15, further comprising:

a subsystem, implemented at least partially in hardware, that determines that third metadata from a second external media source includes information that refers to a particular multimedia content described by the combined metadata, and that the information that refers to the particular multimedia content is included in the combined metadata;

a subsystem, implemented at least partially in hardware, that, in response to determining that the third metadata includes the information that refers to the particular multimedia content, adds the second external media source as a source for the particular multimedia content in the combined metadata.

18. The apparatus of claim 15, further comprising:

a subsystem, implemented at least partially in hardware, that receives user input specifying search criteria;

wherein the list of multimedia content is caused to be displayed in response to the received search criteria.

19. The apparatus of claim 15, further comprising:

a subsystem, implemented at least partially in hardware, that receives user input specifying search criteria;

wherein the list of multimedia content is caused to be displayed in response to the received search criteria;

in response to user input selecting particular multimedia content for download or viewing from the list, including data indicating that the particular multimedia content was selected in the combined metadata.

20. The apparatus of claim 15, further comprising:

a subsystem, implemented at least partially in hardware, that receives user input specifying search criteria;

wherein the list of multimedia content is caused to be displayed in response to the received search criteria;

wherein the displayed list of multimedia content displays particular descriptive criteria for particular multimedia content;

a subsystem, implemented at least partially in hardware, that, in response to user input selecting, from the displayed list, to search for the particular descriptive criteria, of which at least one is an actor, category, genre, year, or rating, including the particular descriptive criteria in the combined metadata.

21. The apparatus of claim 15, further comprising:

a subsystem, implemented at least partially in hardware, that receives first user input that selects the particular multimedia content;

a subsystem, implemented at least partially in hardware, that displays descriptive information about the particular multimedia content;

a subsystem, implemented at least partially in hardware, that in response to second user input selecting search criteria from the descriptive information, of which at least one is an actor, category, genre, year, or rating, includes the search criteria in the combined metadata.

* * * * *